United States Patent Office 3,075,944
Patented Jan. 29, 1963

---

3,075,944
FLAME RETARDANT COMPOSITIONS CONTAINING POLYOLEFINES, ANTIMONY OXIDE AND ETHERS HAVING AT LEAST THREE BROMINE ATOMS
Georg Wick, Hans Niedenbruck, and Kurt Kopetz, all of Marl, Kreis Recklinghausen, Germany, assignors to Chemische Werke Huls Aktiengesellschaft, Marl, Kreis Recklinghausen, Germany, a corporation of Germany
No Drawing. Filed Sept. 7, 1960, Ser. No. 54,344
Claims priority, application Germany Dec. 18, 1959
5 Claims. (Cl. 260—41)

Flame retardant polyolefine compositions have been proposed which are characterized by a content of from 5 to 20% by weight of a 2,4,6-tribromoaniline of the formula

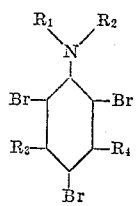

in which $R_1$ and $R_2$ stand for a member of the group consisting of hydrogen, aryl groups and alkyl groups containing from 1 to 6 carbon atoms and $R_3$ and $R_4$ stand for a member of the group consisting of hydrogen and alkyl groups containing from 1 to 6 carbon atoms and by a content of from 3 to 10% by weight of antimony trioxide calculated upon the weight of the polyolefine.

We have found that difficultly flammable polyolefine compositions can be made advantageously by substituting a diaromatic or aromatic-aliphatic ether containing at least three bromine atoms for the 2,4,6-tribromoaniline of the above described compositions. The ethers referred to are represented by the general formula

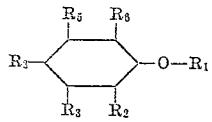

in which $R_1$ is an aromatic group which may be brominated and/or chlorinated or a straight chain or branched alkyl group containing from 2 to 12 carbon atoms and may contain an OH group, and $R_2$ to $R_6$ stand for a member of the group consisting of hydrogen, chlorine, and bromine, said ether containing at least three bromine atoms attached to an aromatic group.

Examples of suitable diaromatic ethers containing bromine attached to the nucleus are tribromodiphenylether, tetrabromodiphenylether, pentabromodiphenylether, hexabromodiphenylether, tribromomonochlorodiphenylether, tribromodichlorodiphenylether, tribromotrichlorodiphenylether, and tetrabromodichlorodiphenylether. The halogen atoms of these diaromatic ethers may be distributed in any arrangement on the aromatic rings.

Examples of suitable aromatic-aliphatic ethers are the 2-ethylhexyl-, n-octyl-, nonyl-, butyl-, dodecyl- and 2,3-dioxopropyl ethers of tribromophenol, tribromomonochlorophenol and tribromodichlorophenol.

The term polyolefines embraces the thermoplastic polyolefines such as polyethylene, polypropylene, polyisobutylene, polystyrene etc. The polyolefine may contain additions of filling material, coloring materials, lubricants, stabilizers etc.

The nucleus brominated ether is used in quantity amounting to from 5 to 20 percent, preferablby from 6 to 12% and especially from 10 to 12% by weight based upon the weight of the polyolefine in the composition. The antimony trioxide is used in quantity amounting to from 3 to 10% preferably 4 to 8% by weight based upon the weight of the polyolefine in the composition.

The brominated ether and antimony trioxide are added to the polyolefine in any order or simultaneously and mixed therewith in known manner. The so-obtained mixtures are formed or shaped in known manner.

The flame retardant properties of materials may be determined according to DIN (Deutsche Industrienormen) 4102 upon plates made of the material to be tested having the dimensions 100 x 190 x 4 mm. The plates are arranged vertically in a rack and perpendicular to each other. The rack is hung in a shaft oven and subjected to a definite volume of heated fresh air introduced from below through a screen and subjected to the action of a flame from a ring burner. Plates made of the flame retardant composition must not continue to burn after the removal of the flame. Tests of the above described mixtures were carried out according to DIN 4102 on plates of 300 x 70 x 4 mm. The two plates were subjected in a shaft oven to a colorless Bunsen burner flame 15 cm. long for 4 minues. After removal of the Bunsen flame the time required for the flaming of the test pieces to stop was determined. Mixtures which extinguish in a short time after removal of the Bunsen flame comply with the requirements of DIN 4102 and may be labeled as being flame retardant.

The addition of the above mentioned brominated aromatic or aromatic-aliphatic ethers in combination with antimony trioxide gives polyolefine mixtures which have not only excellent flame retardant but also good mechanical properties and are therefore adapted for use in all situations in which a flame retardant material is required.

The invention is illustrated by the following specific examples.

Example 1

100 parts by weight of polyethylene, 9 parts by weight of pentabromodiphenylether and 5 parts by weight of antimony trioxide are mixed, compacted on rolls at 190° C. and then granulated. The granules are formed into plates having the limensions 300 x 70 x 4 mm. and subjected in a shaft furnace fir 4 minutes to a colorless Bunsen flame 15 centimeters long. After removal of the gas flame the plates extinguished within a short time.

Example 2

100 parts by weight of polypropylene, 10 parts by weight of glycerine-α-2,4,6-tribromophenylether and 8 parts by weight of antimony trioxide were mixed and the mixture formed into plates as described in Example 1. In five parallel flame resistance tests all of the plates extinguished immediately upon removal of the gas flame.

Example 3

100 parts by weight of polyethylene, 10 parts by weight of tribromotrichlorodiphenylether and 5 parts by weight of antimony trioxide were mixed and the mixture formed into plates as described in Example 1. In the flame retardant test as described in Example 1 all plates in 6 parallel tests extinguished immediately upon the removal of the gas flame.

Example 4

100 parts by weight of polystyrene, 8 parts by weight of pentabromodiphenylether and 5 parts by weight of antimony trioxide were mixed and formed into plates as described in Example 1. In flame retardant tests as described in Example 1 all plates extinguished in a short time after removal of the gas flame.

We claim:

1. A flame retardant composition comprising a polyolefine selected from the group consisting of poly-alpha-olefines and polystyrene, from 5 to 20% by weight based upon the weight of the polyolefine of an ether and from 3 to 10% by weight based upon the weight of the polyolefine of antimony trioxide, said ether being a member of the group consisting of diaromatic and aromatic-aliphatic ethers containing at least three bromine atoms attached directly to the aromatic nucleus of the general formula

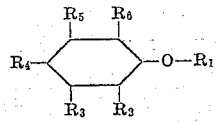

in which $R_1$ is a member of the group consisting of unsubstituted aromatic groups, aromatic groups containing bromine, aromatic groups containing chlorine, unsubstituted straight chain and branched chain alkyl groups having from 2 to 12 carbon atoms and OH substituted straight chain and branched chain alkyl groups having from 2 to 12 carbon atoms, and $R_2$ to $R_6$ each stands for a member of the group consisting of hydrogen, chlorine and bromine.

2. A flame retardant composition as defined in claim 1 in which the polyolefine is polyethylene and the ether is pentabromophenylether.

3. A flame retardant composition as defined in claim 1 in which the polyolefine is polypropylene and the ether is glycerine-α-2,4,6-tribromophenylether.

4. A flame retardant composition as defined in claim 1 in which the polyolefine is polyethylene and the ether is tribromotrichlorodiphenylether.

5. A flame retardant composition as defined in claim 1 in which the polyolefine is polystyrene and the ether is pentabromodiphenylether.

References Cited in the file of this patent

UNITED STATES PATENTS

| | | |
|---|---|---|
| 2,669,521 | Bierly | Feb. 16, 1954 |
| 2,676,946 | McCurdy et al. | Apr. 27, 1954 |

FOREIGN PATENTS

| | | |
|---|---|---|
| 808,255 | Great Britain | Jan. 28, 1959 |